United States Patent [19]
Archer

[11] 3,887,354
[45] June 3, 1975

[54] METHOD FOR FACILITATING THE HARVEST OF FRUIT

[75] Inventor: Milton C. Archer, Olivette, Mo.

[73] Assignee: Monsanto Company, St. Louis, Mo.

[22] Filed: Sept. 21, 1973

[21] Appl. No.: 399,663

[52] U.S. Cl............................................ 71/90; 71/73
[51] Int. Cl................................................ A01n 9/12
[58] Field of Search.................................... 71/73, 90

[56] References Cited
UNITED STATES PATENTS
3,536,473  10/1970  Popoff et al. ..................... 71/90

*Primary Examiner*—Lewis Gotts
*Assistant Examiner*—Catherine L. Mills
*Attorney, Agent, or Firm*—Arnold H. Cole; Donald W. Peterson; Neal E. Willis

[57] ABSTRACT

The harvest of fruit from bearing trees and plants is facilitated by application of effective concentrations of 4,5-dibromothiophene-2-carboxylic acid.

10 Claims, No Drawings

METHOD FOR FACILITATING THE HARVEST OF FRUIT

This invention relates to a method for facilitating the harvest of tree fruit. More particularly, it is concerned with the provision of a novel chemical agent which serves to accelerate or enhance the normal abscission process in such fruit.

The commercial growing of edible tree fruit is a major international industry. As expected, those engaged in this industry are concerned about getting their product to the consumer in the most economical manner. Traditionally, the harvesting of fruit crops has been accomplished by hand picking. However, in recent years, shortages of manual laborers have become increasingly more frequent. Coupled with constantly spiraling wages, such shortages have lent inpetus to the investigation of alternative harvesting methods.

One result of this investigation has been the development and testing of a wide variety of mechanical devices designed to reduce or limit the need for manual efforts. Said devices have generally been vibrators or shakers which can be driven through the areas where the fruit-bearing trees grow. They attach to the trunk, or to major branches, and are actuated to produce a vibratory motion which either loosens the fruit or causes it to fall to the ground. Certain of these mechanical devices also include means for catching or otherwise collecting the fruit as it falls. Although several types of such devices are now being used, they normally require pretreatment of the fruit with an abscission agent in order to be effective, and they often present a problem by causing damage to whole trees or parts thereof.

According to the present invention, the harvesting of tree fruit is facilitated by applying thereto a chemical agent. Although the mode of action of the chemical on the fruit is not known with certainty, it is found that the treated fruit are more loosely attached to the stem or petiole. Removal of such fruit from the tree is thus facilitated, and, indeed, the treated fruit often fall from the tree without the need for an external force, either manual or mechanical.

In practicing the present invention, the particular chemical agent employed is 4,5-dibromothiophene-2-carboxylic acid. The compound can be prepared from the reaction of 2-thiophenecarboxylic acid with bromine as described in *Thiophene and Derivatives* by H. D. Hartough, Interscience Publishers, Inc., 1952. Further, compounds of this type have been disclosed as herbicides or plant growth inhibitors in U.S. Pat. No. 3,536,473.

The compound of this invention is most advantageously applied to the fruit-bearing plant by spraying. While such application will normally be carried out with ground-based equipment, aerial spray techniques can be employed in those instances where a particular crop or cultural practices indicate economic feasibility.

For use in accordance with this invention, said compound may be formulated and applied as a liquid, a dust or a wettable powder following procedures known to the art. The active ingredient is admixed with a suitable inert material serving as a solvent, diluent or dispersant, after which such admixture is further diluted to a desired volume of spray. It will be understood that the composition to be applied can also contain surfactants, wetting agents, emulsifiers, sticking agents or other types of adjuvants whose nature and function have long been recognized in the art.

The method of this invention can be conveniently employed in the treatment of any fruit-bearing trees or plants. Representative of the fruits for which harvest can be thus facilitated are the common table fruit such as apples, plums and cherries, the citrus fruit such as oranges and lemons, along with others such as olives, grapes and nuts. It is particularly preferred to use the compound of the present invention as an aid in the harvesting procedures for the nondeciduous tree citrus and olives.

The time of application will vary from a few days (e.g. 3-4) up to about 2 weeks prior to the planned date of harvest. Specific selection within the short range will be dependent upon the type and variety of fruit being treated and upon the stage of fruit development prior to treatment. These factors will also be considered in the determination of the rate of application. From a practical standpoint, the compound of this invention is applied in a spray concentration of from about 100 to about 4,000 ppm. (parts per million) active ingredient in total spray volume. A desirable degree of harvest facilitation is not obtained at lesser concentrations, while higher concentrations detract from economy and may also cause undesired injury to leaves and/or green fruit.

To illustrate the practice of the method of this invention, tests are conducted to determine the effect of 4,5-dibromothiophene-2-carboxylic acid on various tree or plant fruit. Branches selected for these tests are those which contain at least 20 pieces of fruit that are to be harvested within the following 2 weeks. The fruit are sprayed with a formulation of the active ingredient described herein, and, a number of days after treatment, observations are made of the number of fruit which have fallen to the ground. Fruit which has not fallen is clipped from the branch, and measurement is made of the force in pounds required to remove the stem from the fruit on a straight pull. Apparatus for such measurements is described in *Plant Physiology*, Volume 43, Part B, pages 1,560–1,576 (1968). When the force required to remove the stem from the fruit is too small to be measured on such apparatus, it is designated as "too loose to pull."

In these tests, observations are also made of any adverse effects on any leaves or green fruit which may be present on the branches. The extent of plugging, the removal of a part of the peel or rind when the stem is pulled from the fruit, is similarly noted along with any other indications of fruit injury. Although significant portions of most fruit crops are used for processing into juices, concentrates and canned sections, the remainder must be marketed as fresh fruit. While injuries such as rind pitting, burning or discoloration are not of real concern in the case of processed fruit, such undesirable changes in appearance are detrimental to fresh fruit sales. In addition, injuries such as plugging or rind splitting cannot be accepted for either market since they generally lead to rapid fruit rot.

In the illustrative tests hereinafter presented, it should be understood that untreated control branches are selected in each instance, and corresponding measurements and observations are made on the fruit thereof. The tests also included treatment of branches with cycloheximide, a known fruit abscission agent, at a rate which would normally cause all treated fruit to drop or be too loose for a measurement of pull force. By noting those instances in which this known compound does not demonstrate its expected activity, conclusions can be drawn as to the validity of a particular test due to the adverse effects of external factors. Some of these external factors include problems with the spraying apparatus which often leads to inadequate or non-uniform application, and rainfall within a few hours after applicaiton, which may wash off the chemical treatment.

EXAMPLE I

Spray formulations for this test are prepared by mixing a small quantity (½ or 1 grams) of 4,5-dibromothiophene-2-carboxylic acid in acetone to a total volume of 100 or 200 ml. Then, 10 ml. of surfactant is added, followed by dilution with water to a total volume of 500 ml. The active ingredient in these formulations is thus present at concentrations of 1,000 and 2,000 ppm., and sprays are applied to branches of Valencia oranges. After 7 days, fruit is removed from the test branches, and measurements of pull force are made for at least 10 fruit from each branch. At a concentration of 1,000 ppm., an average pull of 16.5 pounds is needed, and the average pull needed at 2,000 ppm. is 17.6 pounds. Plugging at the lower rate is 60 percent, but is reduced to 30 percent at the higher rate. The untreated fruit on the control branch requires an average pull of 26.2 pounds, and 90 percent plugging occurs.

EXAMPLE II

A second test is conducted in the manner of Example I using the same variety of fruit, although a month later in the growing season. Here, at each concentration, all of the treated fruit has dropped from the trees within 7 days, some drop occurring within the first 2-3 days. Some light burn is observed on mature fruit, along with dropping of leaves and green fruit. Untreated fruit on the control branch require an average pull of 17.6 pounds and show 60 percent plugging.

EXAMPLE III

In this test, spray formulations are prepared as described above at concentrations of 500, 1,000, 2,000 and 4,000 ppm., and two sets of branches containing Hamlin oranges are treated at each rate. After 6 days, the untreated fruit require an average pull of 16.7 pounds with 90 percent plugging. In the two sets of treated branches, the fruit is too loose to pull at both higher rates and also at the lowest rate in one set. The other 500 ppm. treatment needs an average pull of 7.3 pounds, while the 1000 ppm. treatments require an average pull of 6.6 and 8.1 pounds, respectively. No plugging occurs with any of the treated branches, and some of the fruit falls to the ground before the observation date. Some leaf drop and mature fruit burn is noted, particularly at the highest application rates.

EXAMPLE IV

Concurrently with the test of Example III, application at the noted rates is also made on branches of the same variety of fruit about 3-4 hours after treatment with a $3 \times 10^{+3}$ molar concentration of 2,3,5-triiodobenzoic acid. It has been reported that ethylene is desirable in the abscission zone of plants in order to accelerate the abscission process. Since the triiodobenzoic acid has been found to inhibit the transport of auxins within plants, and since auxins are antagonistic to ethylene production, the pretreatment attempted to minimize auxin interference. However, after 6 days, the observations made of treated branches indicate no improvements over the results without triiodobenzoic acid. Indeed, at 1,000 ppm. there is little or no loosening of treated fruit, while the 500 ppm. rate requires 10.9 pounds average pull. It should be noted that a control branch which received only the pretreatment showed no loosening of the fruit.

EXAMPLE V

About a month after the tests in the two immediately preceding Examples, the same variety of fruit was tested by application of 4,5-dibromothiophene-2-carboxylic acid at concentrations of 100, 300, 500 and 700 ppm. Tests were also included with pretreatments of 2,3,5-triiodobenzoic acid, both $3 \times 10^{-3}$ and $6 \times 10^{-3}$ molar. After 7 days, fruit on the untreated control branch require an average pull of 13.1 pounds, and 100 percent of these fruit are plugged. The lower acid concentration pretreatment is inactive on the control branch, also with plugging, whereas the higher concentration leaves fruit on the control branch too loose to pull.

Fruit on branches treated solely with the active ingredient of this invention show no loosening at the 100 ppm. rate, but require reduced average pull of 10.7, 10.4 and 11.3 pounds at the other three rates employed with plugging of 10-20 percent. The lowest rate of active ingredient with the lower concentration of pretreatment shows 60 percent plugs with an average pull of 12.7 pounds. There is no plugging at the other rates with average pull of 7.3, 9.7 and 9.1 pounds. With the higher pretreatment concentration, the 500 and 700 ppm. rates of active ingredient leave the fruit too loose to pull. The lower rates in this latter series require average pull of 10.7 and 10.2 with 10-20 percent plugging.

While the invention has been described herein with regard to certain representative examples for purpose of illustrating its practice, it is not to be construed as limited thereto. Those skilled in the art will readily recognize the variations and modifications which can be made without departing from the spirit and scope of this invention.

What is claimed is:

1. A method for facilitating the harvest of fruit which comprises applying an effective concentration of 4,5-dibromothiophene-2-carboxylic acid to fruit bearing trees or plants within 2 weeks of the date of harvest.

2. A method as defined in claim 1 wherein application is at a concentration of 100 to 4,000 ppm.

3. A method as defined in claim 1 wherein application is at least 3 or 4 days prior to the date of harvest.

4. A method as defined in claim 1 wherein the fruit are citrus or olives.

5. A method as defined in claim 4 wherein the fruit are citrus.

6. A method as defined in claim 1 wherein application is at a concentration of 100 to 4,000 ppm. and is at least 3 or 4 days prior to the date of harvest.

7. A method as defined in claim 6 wherein the fruit are citrus or olives.

8. A method as defined in claim 7 wherein the fruit are citrus.

9. A method as defined in claim 1 wherein application is at a concentration of 100 to 4,000 ppm. and the fruit are citrus or olives.

10. A method as defined in claim 9 wherein the fruit are citrus.

* * * * *